United States Patent [19]

Ahlbrandt

[11] Patent Number: 4,724,507
[45] Date of Patent: Feb. 9, 1988

[54] DEVICE FOR THE CONTINUOUS TREATMENT OF SURFACES

[75] Inventor: Andreas Ahlbrandt, Lauterbach, Fed. Rep. of Germany

[73] Assignee: Enercon Industries, Inc., Menomonee Falls, Wis.

[21] Appl. No.: 944,077

[22] Filed: Dec. 22, 1986

[51] Int. Cl.⁴ .................................. H01T 19/00
[52] U.S. Cl. ................................. 361/225; 361/230; 427/39; 427/40
[58] Field of Search ................... 361/212–214, 361/225, 229, 230, 233; 250/324–326; 427/39, 40

[56] References Cited

U.S. PATENT DOCUMENTS

| | | | |
|---|---|---|---|
| 2,844,731 | 7/1958 | Plonsky et al. | 250/324 |
| 3,503,859 | 3/1970 | Goncarovs et al. | 204/165 |
| 4,340,926 | 7/1982 | Payne | 361/230 X |
| 4,451,497 | 5/1984 | Dolezolek et al. | 427/39 |
| 4,615,906 | 10/1986 | Kolbe et al. | 427/40 |

FOREIGN PATENT DOCUMENTS

| | | |
|---|---|---|
| 1489001 | 6/1969 | Fed. Rep. of Germany . |
| 7307043 | 7/1973 | Fed. Rep. of Germany . |
| 2550810 | 5/1977 | Fed. Rep. of Germany . |
| 3302161 | 1/1983 | Fed. Rep. of Germany . |
| 1453653 | 10/1976 | United Kingdom ............ 361/225 |

Primary Examiner—L. T. Hix
Assistant Examiner—D. Rutledge
Attorney, Agent, or Firm—Quarles & Brady

[57] ABSTRACT

A device for the continuous treatment of surfaces of thin sheet material (24) includes a treatment roller (7) arranged in a treatment chamber (1). A corona electrode (14) is arranged in the wall of this treatment chamber (1) in such a manner that its insulation (15) forms one part of the wall, but the high voltage element (16) of the corona electrode (14) is located outside of the treatment chamber.

7 Claims, 2 Drawing Figures

DEVICE FOR THE CONTINUOUS TREATMENT OF SURFACES

BACKGROUND OF THE INVENTION

The invention relates to a device for the continuous treatment of the surfaces of foils by means of an electrical corona discharge. In such devices, a treatment roller for guiding the foil is arranged in a partially evacuated treatment space. The foil is closely guided into the treatment space between one pair of rollers and out of the treatment space between another pair of rollers. At least one corona electrode is positioned opposite the treatment roller and is composed of insulation and a high voltage element. Such a device is described in German Publication DE-OS No. 31 34 615.

Recently, it has been determined that the corona treatment of foils in a slightly evacuated treatment space entails great advantages as compared to the use of normal atmospheric pressure. In that case, the corona develops at low voltage, so that the energy consumption and the formation of ozone are reduced. The latter is significant with respect to protection of the environment. The lower voltage level results in the fact that the foil leaving the device is electrostatically charged to a lesser extent. This leads to improved adhesion and wetting characteristics for the foil, which is a great advantage for foils which serve as photographic carrier material.

The device according to the above mentioned German Publication DE-OS No. 31 34 615 features a corona electrode inside the treatment chamber. When high voltage is applied, the corona electrode not only discharges in the direction of the treatment roller, but also in other directions, especially toward the walls of the treatment chamber. This is especially true for the high voltage wire which must be led into the treatment chamber to supply the corona electrode. This discharge into non-desired directions leads to energy loss and reduces the quality of the treatment on the foil.

Aside from this, the previously known device is constructed in a relatively costly fashion, since it not only has discharge electrodes within the treatment chamber, but the feed and exit of the foil is accomplished by means of two pairs of rollers through an antechamber and additionally two guide rollers underneath the treatment roller.

SUMMARY OF THE INVENTION

An object of the invention is to design a device of the type mentioned in the background of the invention above so that it can be constructed in the simplest fashion and with a directed corona which can be aimed to the greatest degree exclusively onto the foil which is to be treated.

This object is accomplished according to the invention in that the discharge electrode along with its insulation forms a part of the wall of the treatment chamber and the high voltage element of the discharge electrode is located outside of the treatment chamber.

As a result of this design the discharge electrode discharges into the treatment chamber in a direction towards the treatment roller. This corona discharge which is directed onto the treatment roller results not only from the fact that the treatment roller is connected to a potential which is opposite of the discharge electrode, but also because of the fact that the treatment chamber is operated with reduced pressure, which is favorable for the development of the corona. Since the high voltage element of the discharge electrode and correspondingly the high voltage lead wires are both located outside of the treatment chamber, where normal pressure prevails, a corona discharge there is not possible. Because of this principle of construction according to the invention, the corona treatment device is simplified as compared to that which was previously known and leads to improved treatment results with less energy consumption.

For threading the foil and for inspection of the device it is advantageous for the discharge electrode to be provided in a lid on the treatment chamber which can be opened upwards.

It is especially simple to open the treatment chamber for the purpose of inserting the foil if it is composed of two chamber halves, each chamber half starting at one side of the treatment roller and extending to the middle. Each chamber half also includes a discharge electrode positioned opposite the treatment roller. The chamber halves are constructed so as to be separable toward both sides of the treatment roller thus completely exposing the roller.

The device is simplified to a great extent in comparison to the previously known device according to German Publication DE-OS No. 31 34 615 if underneath the treatment roller, two guide rollers are provided which are parallel to the axis of the treatment roller. The two guide rollers have a minimal clearance between themselves, between which the in-going and out-going foil is guided. Underneath the two guide rollers, a sealing roller is provided near the guide rollers. The sealing roller is parallel to the axes of the guide rollers and exactly between them for sealing the space between the in-going and out-going foil. As a result of this design, a total of only three rollers are needed for the feed and exit of the foil. Since the guide rollers are arranged underneath the treatment rollers, a sufficiently broad wrap-around of the treatment roller by the foil which is to be treated results.

In order to accommodate foils of variable thickness and to make the threading of the foil easier, it is advantageous to have the sealing roller arranged in an adjustable manner within limits along a center line which passes through the center of the treatment roller and between the guide rollers.

A proper gusset seal between both guide rollers is especially easy to achieve if the sealing roller has a surface which is elastically deformable in a radial direction.

By the arrangement of both guide rollers and the sealing roller, a result is achieved whereby the sealing roller can pull the foil into the device and also extract the foil from the device. It is therefore sufficient to have a single drive for the sealing roller.

It is nevertheless advantageous, particularly for thin foils, if, according to another design of the invention, the sealing roller and both guide rollers are driven by means of three gears which mesh with each other in order to prevent friction or the development of creases.

The walls of the treatment chamber can extend close to the treatment roller if the part of the wall of the treatment chamber surrounding the treatment roller is composed of an insulating material.

The invention lends itself to numerous embodiments. One of these is schematically represented in the drawing and is described in the following.

DESCRIPTION OF THE PREFERRED EMBODIMENT

Figure 1:
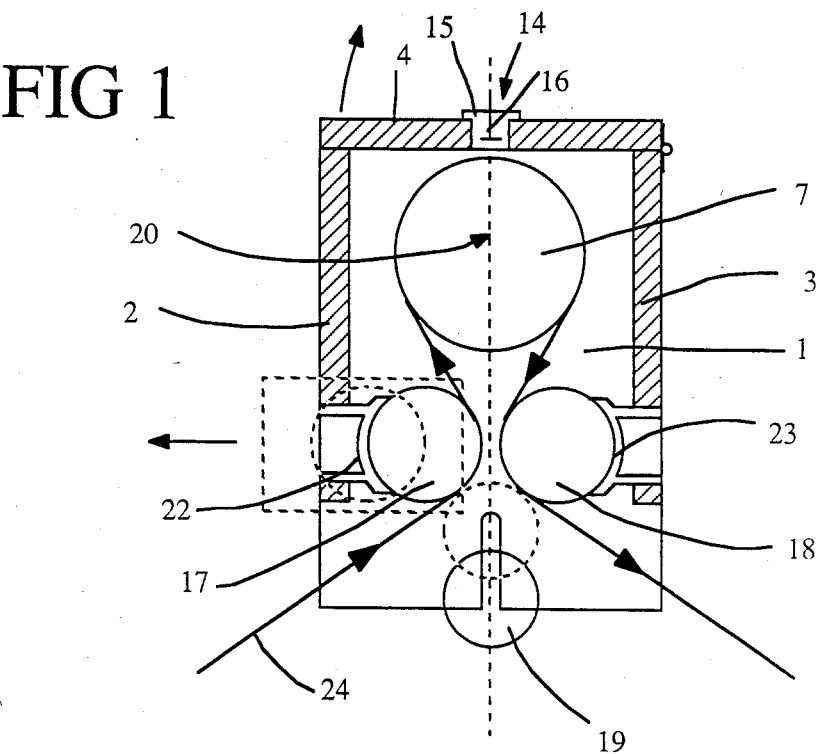
FIG. 1 is a cross section through a corona treatment chamber according to the invention.
Figure 2:
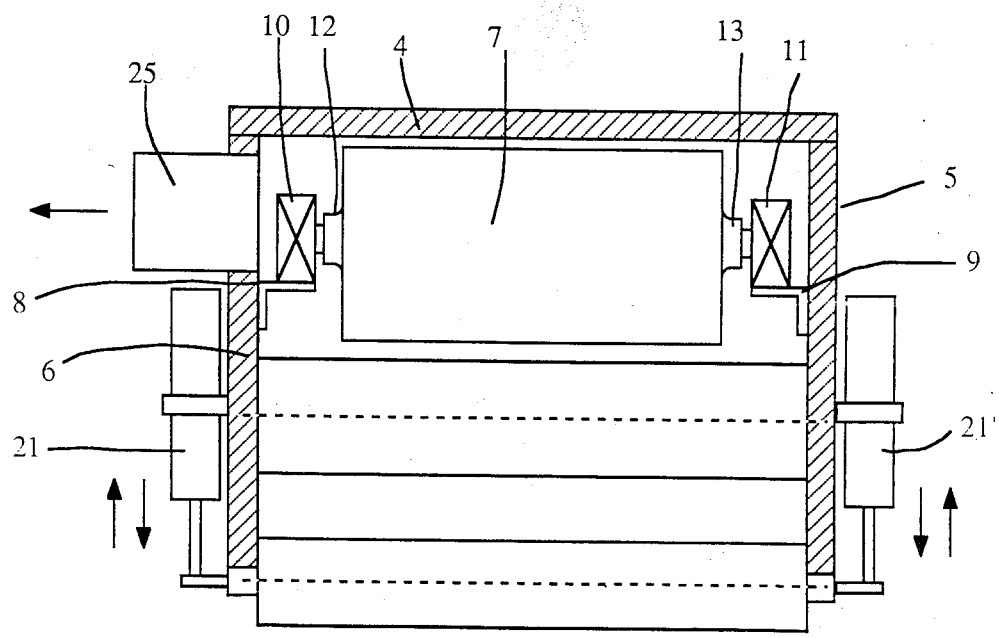
FIG. 2 is a longitudinal section through the corona treatment chamber of FIG. 1.

Referring to FIGS. 1 and 2, a corona treatment chamber 1 is composed of two side walls 2 and 3, a lid 4 and front walls 5 and 6. These side walls 2 and 3, front walls 5 and 6 and the lid 4 are made of an insulating material. On the inside of the treatment chamber 1 there is a treatment roller 7 which is rotatably mounted. A pair of brackets 8 and 9 are fastened inside of the chamber 1 on the front walls 5 and 6. A pair of bearing blocks 10 and 11 are mounted on the brackets 8 and 9, respectively, and each bearing block 10 and 11 receives and supports a journal 12 and 13, respectively, of the treatment roller 7. Of course, the treatment roller 7 with its journals 12 and 13 could also penetrate the front walls 5 and 6 and be supported outside of the treatment chamber 1. Also shown in FIG. 2 is an air suctioning nozzle 25, by means of which air can be suctioned from the treatment chamber 1 for generating a partial vacuum.

Referring to FIG. 1, a discharge electrode 14 is arranged in the lid 4 and is positioned opposite the treatment roller 7. The electrode 14 consists of insulation 15 and a high voltage element 16. An important aspect of this invention is the fact that a portion of the insulation 15 forms part of the lid 4 of the treatment chamber 1.

The bottom of the treatment chamber 1 is bordered by two guide rollers 17 and 18 and a sealing roller 19. All of the rollers 17, 18 and 19 are parallel with each other. The sealing roller 19 is located exactly on a center line 20, which extends from the middle of the treatment roller 7 and between the guide rollers 17 and 18. The sealing roller 19 is shiftable within limits on this center line 20 by the action of two lifting cylinders 21.

Referring again to FIG. 1, the guide rollers 17 and 18 are sealed on one part of their surfaces by means of sealing units 22 and 23 which are attached to the side walls 2 and 3, respectively. Front wall means for sealing are not shown. Schematically indicated in FIG. 1 is foil 24, which is to be treated in the device. The foil 24 is fed into the device, as seen coming from the left in FIG. 1, between guide roller 17 and the sealing roller 19. THe foil 24 then wraps around the treatment roller 7 and leaves the chamber 1 between guide roller 18 and the sealing roller 19.

In another embodiment of the invention (not shown), the treatment chamber consists of two chamber halves where each chamber half contains a discharge electrode and one of the guide rollers 17 and 18. Both chamber halves are constructed so as to be separable in order to insert the foil 24 in a particularly simple manner.

The table below is a listing of references used in the drawings:

1. treatment chamber
2. side wall
3. side wall
4. lid
5. front wall
6. front wall
7. treatment roller
8. bracket
9. bracket
10. bearing block
11. bearing block
12. journal
13. journal
14. discharge electrode
15. insulation
16. high voltage element
17. guide roller
18. guide roller
19. sealing roller
20. center line
21. lifting cylinder
22. sealing unit
23. sealing unit
24. foil
25. air suction nozzle

What is claimed is:

1. A device for the continuous treatment of surfaces of webs of thin sheet material by means of electrical corona discharge, comprising:
   a treatment chamber which is sealed to the outside and which is partially evacuated on the interior of the chamber;
   a treatment roller disposed within the treatment chamber which guides the web through the chamber; and
   at least one corona electrode positioned opposite the treatment roller, the corona electrode consisting of a high voltage element disposed within an insulating body, and the corona electrode and its insulating body forming a part of a surface of the treatment chamber;
   wherein the high voltage element of the corona electrode is located outside of the treatment chamber.

2. The device of claim 1 in which the corona electrode forms a part of a lid of the treatment chamber which can be opened upward.

3. The device of claims 1 or 2 further comprising:
   two guide rollers for guiding the in-going and out-going web, the two guide rollers being parallel and positioned underneath the treatment roller and parallel to its axis, the two guide rollers being positioned relative to each other with minimal clearance; and
   a sealing roller parallel to the axis of the guide rollers and positioned underneath the guide rollers and exactly between them for sealing the space between the in-going and out-going web in the area of the guide rollers.

4. The device of claim 3 in which the sealing roller is movable within limits along a centerline through the center of the treatment roller and between the guide rollers.

5. The device of claim 3 in which the sealing roller has a surface which is elastically deformable in a radial direction.

6. The device of claim 3 in which the sealing roller is driven.

7. The device of claims 1 or 2 in which the treatment chamber includes walls composed of an insulating material in an area surrounding the treatment roller.

* * * * *

UNITED STATES PATENT AND TRADEMARK OFFICE
CERTIFICATE OF CORRECTION

PATENT NO. : 4,724,507
DATED : February 9, 1988
INVENTOR(S) : Andreas Ahlbrandt

It is certified that error appears in the above-identified patent and that said Letters Patent is hereby corrected as shown below:

In Column 1,
    at Line 7, Change "foils" to --thin sheet material, hereinafter referred to as a web,--;
    at Line 9, change "foil" to --web--;
    at Line 10, change "foil" to --web--;
    at Line 18, delete "of foils";
    at Line 25, change "foil" to --web--;
    at Line 27, change "foil" to --web--;
    at Line 28, change "foils" to --webs--;
    at Line 40, change "foil" to --web--;
    at Line 44, change "foil" to --web--;
    at Line 54, change "foil" to --web--.

In Column 2,
    at Line 11, change "foil" to --web--;
    at Line 16, change "foil" to --web--;
    at Line 31, change "foil" to --web--;
    at Line 35, change "foil" to --web--;
    at Line 37, change "foil" to --web--;
    at Line 39, change "foil" to --web--;
    at Line 41, change "foils" to --webs--;
    at Line 42, change "foil" to --web--;
    at Line 54, change "foil" to --web--;
    at Line 58, change "foils" to --webs--.

UNITED STATES PATENT AND TRADEMARK OFFICE
CERTIFICATE OF CORRECTION

PATENT NO. : 4,724,507
DATED : February 9, 1988
INVENTOR(S) : Andreas Ahlbrandt

It is certified that error appears in the above-identified patent and that said Letters Patent is hereby corrected as shown below:

In Column 3,
    at Line 45, change "foil" to --web--;
    at Line 46, change "foil" to --web--;
    at Line 48, change "THe" to --The--;
    at Line 49, change "foil" to --web--;
    at Line 57, change "foil" to --web--.
In Column 4,
    at Line 18, change "foil" to --web--.

Signed and Sealed this

Fifth Day of July, 1988

*Attest:*

DONALD J. QUIGG

*Attesting Officer*       *Commissioner of Patents and Trademarks*

UNITED STATES PATENT AND TRADEMARK OFFICE
CERTIFICATE OF CORRECTION

PATENT NO. : 4,724,507
DATED : February 9, 1988
INVENTOR(S) : Andreas Ahlbrandt

It is certified that error appears in the above-identified patent and that said Letters Patent is hereby corrected as shown below:

On the title page, delete:

"[73] Assignee: Enercon Industries, Inc., Menomonee Falls, Wis."

Signed and Sealed this

Twenty-seventh Day of December, 1988

*Attest:*

DONALD J. QUIGG

*Attesting Officer*   *Commissioner of Patents and Trademarks*